(12) United States Patent
Tripathi et al.

(10) Patent No.: US 11,157,556 B2
(45) Date of Patent: Oct. 26, 2021

(54) METHOD AND APPARATUS FOR THUMBNAIL GENERATION FOR A VIDEO DEVICE

(71) Applicant: SLING MEDIA PVT LTD, Bangaluru (IN)

(72) Inventors: Varunkumar Tripathi, Bangalore (IN); Yatish Jayant Naik Raikar, Singasandra (IN); Abhiroop Boggavarapu, Bangalore (IN); Rakesh Ramesh, Bangalore (IN); Sanjiv Topiwalla, Parker, CO (US)

(73) Assignee: SLING MEDIA PVT LTD, Bangaluru (IN)

( * ) Notice: Subject to any disclaimer, the term of this patent is extended or adjusted under 35 U.S.C. 154(b) by 0 days.

(21) Appl. No.: 16/722,089

(22) Filed: Dec. 20, 2019

(65) Prior Publication Data
US 2021/0191976 A1    Jun. 24, 2021

(51) Int. Cl.
*G06F 16/738* (2019.01)
*H04N 21/84* (2011.01)
*H04N 21/845* (2011.01)
*H04N 21/81* (2011.01)

(52) U.S. Cl.
CPC ....... *G06F 16/739* (2019.01); *H04N 21/8153* (2013.01); *H04N 21/84* (2013.01); *H04N 21/8456* (2013.01)

(58) Field of Classification Search
CPC ......... H04N 21/47217; H04N 21/8549; H04N 21/2387; H04N 21/84; H04N 21/8456; H04N 21/8153; G06F 16/739; G11B 27/34
See application file for complete search history.

(56) References Cited

U.S. PATENT DOCUMENTS

| | | | | |
|---|---|---|---|---|
| 7,251,790 B1 * | 7/2007 | Drucker | ................ | G06F 16/957 715/838 |
| 7,293,280 B1 * | 11/2007 | Gupta | ................... | G06F 40/169 725/139 |
| 7,962,942 B1 * | 6/2011 | Craner | ............. | H04N 21/26616 725/88 |

(Continued)

FOREIGN PATENT DOCUMENTS

| EP | 2385528 A1 * | 11/2011 | ........... G06F 16/739 |
|---|---|---|---|
| WO | WO-2010122644 A1 * | 10/2010 | ......... H04N 21/4316 |

(Continued)

*Primary Examiner* — Daniel T Tekle
(74) *Attorney, Agent, or Firm* — Lorenz & Kopf, LLP

(57) ABSTRACT

Systems and processes are provided to generate and transmit a thumbnail image for a video searching function including a video input configured to receive a video signal, a processor configured to decode the video signal to generate a video program, to generate a plurality of thumbnail images in response to the video program, to determine a subset of the plurality of thumbnail images in response to a client request and to couple the subset of the plurality of thumbnail images to a network interface, and the network interface configured to transmit and receive data on a local area network, the network interface being operative to receive the client request from a client device and to transmit the subset of the plurality of thumbnail images to the network interface for transmission to the client device.

13 Claims, 4 Drawing Sheets

400

(56) References Cited

U.S. PATENT DOCUMENTS

| | | | | |
|---|---|---|---|---|
| 8,108,535 B1* | 1/2012 | Roberts | | H04L 65/4092 709/231 |
| 8,296,656 B2* | 10/2012 | Dowdy | | G06F 16/64 715/727 |
| 8,736,557 B2* | 5/2014 | Chaudhri | | G06F 3/04883 345/173 |
| 8,762,844 B2* | 6/2014 | Kim | | H04N 21/4312 715/716 |
| 8,875,022 B2* | 10/2014 | Yun | | H04N 21/8153 715/721 |
| 8,990,861 B2* | 3/2015 | Nishikawa | | H04N 21/4325 725/52 |
| 9,021,526 B1* | 4/2015 | Baron | | H04N 21/2662 725/38 |
| 9,143,589 B2* | 9/2015 | Lee | | G11B 27/007 |
| 9,363,579 B2* | 6/2016 | Frumar | | G06F 3/0482 |
| 9,628,532 B2* | 4/2017 | McHugh | | H04N 21/2402 |
| 9,728,230 B2* | 8/2017 | Cudak | | H04N 21/252 |
| 9,769,546 B2* | 9/2017 | Haykinson | | H04N 21/47217 |
| 10,219,026 B2* | 2/2019 | Eim | | H04N 5/247 |
| 10,375,452 B2* | 8/2019 | Hardin | | H04L 65/4084 |
| 10,423,320 B2* | 9/2019 | Williams | | G11B 27/34 |
| 10,581,707 B2* | 3/2020 | Sen | | H04W 24/08 |
| 2002/0075572 A1* | 6/2002 | Boreczky | | H04N 21/431 359/722 |
| 2002/0186234 A1* | 12/2002 | Van De Streek | | G06F 16/745 715/719 |
| 2003/0026594 A1* | 2/2003 | Shiiyama | | G11B 27/105 386/241 |
| 2003/0061610 A1* | 3/2003 | Errico | | H04N 21/4755 725/46 |
| 2003/0121055 A1* | 6/2003 | Kaminski | | H04N 21/21 725/115 |
| 2003/0184598 A1* | 10/2003 | Graham | | G06F 16/40 715/838 |
| 2004/0141000 A1* | 7/2004 | Baba | | G06F 3/04855 715/716 |
| 2005/0047681 A1* | 3/2005 | Hori | | G06F 16/78 382/305 |
| 2005/0071886 A1* | 3/2005 | Deshpande | | H04N 21/47202 725/135 |
| 2005/0089303 A1* | 4/2005 | Kim | | G11B 27/11 386/323 |
| 2006/0110128 A1* | 5/2006 | Dunton | | G11B 27/034 386/234 |
| 2006/0168298 A1* | 7/2006 | Aoki | | H04N 9/8205 709/231 |
| 2007/0014534 A1* | 1/2007 | Kim | | G11B 27/3081 386/241 |
| 2007/0033632 A1* | 2/2007 | Baynger | | G11B 27/105 725/135 |
| 2007/0174774 A1* | 7/2007 | Lerman | | H04L 67/34 715/723 |
| 2007/0260994 A1* | 11/2007 | Sciammarella | | G06F 3/0482 715/769 |
| 2008/0007570 A1* | 1/2008 | Wessel | | G11B 19/025 345/661 |
| 2009/0024923 A1* | 1/2009 | Hartwig | | G06F 16/70 715/716 |
| 2009/0089837 A1* | 4/2009 | Momosaki | | H04N 21/4394 725/40 |
| 2009/0172543 A1* | 7/2009 | Cronin | | G06F 3/0485 715/721 |
| 2009/0257729 A1* | 10/2009 | Ahn | | H04N 7/17318 386/239 |
| 2009/0284658 A1* | 11/2009 | Cho | | H04N 5/445 348/569 |
| 2010/0251121 A1* | 9/2010 | Rosser | | H04N 21/4316 715/720 |
| 2010/0262912 A1* | 10/2010 | Cha | | G11B 27/329 715/719 |
| 2010/0281371 A1* | 11/2010 | Warner | | G11B 27/28 715/720 |
| 2010/0303440 A1* | 12/2010 | Lin | | H04N 21/6581 386/241 |
| 2011/0035507 A1* | 2/2011 | Brueck | | H04N 21/23439 709/231 |
| 2011/0191679 A1* | 8/2011 | Lin | | H04N 21/8156 715/716 |
| 2012/0030314 A1* | 2/2012 | Kim | | H04L 65/4084 709/219 |
| 2012/0042091 A1* | 2/2012 | McCarthy | | H04N 21/8456 709/231 |
| 2012/0070129 A1* | 3/2012 | Lin | | H04N 21/47202 386/278 |
| 2012/0306928 A1* | 12/2012 | Yoshinaka | | G06T 3/40 345/660 |
| 2012/0324122 A1* | 12/2012 | Miles | | H04L 69/163 709/231 |
| 2013/0307792 A1* | 11/2013 | Andres | | G11B 27/005 345/173 |
| 2014/0169754 A1* | 6/2014 | Jarvinen | | G11B 27/34 386/230 |
| 2014/0282262 A1* | 9/2014 | Gregotski | | H04N 21/8549 715/838 |
| 2014/0337411 A1* | 11/2014 | Panje | | H04N 21/8456 709/203 |
| 2016/0165173 A1* | 6/2016 | Lesh | | G11B 27/105 386/241 |
| 2016/0269455 A1* | 9/2016 | Casey | | H04N 21/8455 |
| 2016/0291860 A1* | 10/2016 | Higuchi | | G06F 3/04883 |
| 2016/0307596 A1* | 10/2016 | Hardin | | H04L 65/602 |
| 2016/0314819 A1* | 10/2016 | Elsner | | H04N 19/136 |
| 2017/0285860 A1* | 10/2017 | Siddiq | | G06F 3/04883 |
| 2018/0255362 A1* | 9/2018 | Chittella | | H04N 21/47202 |
| 2019/0146951 A1* | 5/2019 | Velmurugan | | H04N 21/84 707/822 |
| 2019/0149885 A1* | 5/2019 | Madison | | G06F 16/743 715/838 |
| 2019/0189163 A1* | 6/2019 | Tanaka | | G06F 3/04817 |
| 2019/0200089 A1* | 6/2019 | Pio | | H04N 21/47202 |
| 2019/0265875 A1* | 8/2019 | Park | | G06F 3/04886 |
| 2019/0318169 A1* | 10/2019 | Hu | | G06F 16/739 |
| 2019/0342622 A1* | 11/2019 | Carrigan | | H04N 21/2187 |
| 2019/0379947 A1* | 12/2019 | Casey | | H04N 21/47202 |
| 2020/0029131 A1* | 1/2020 | Mavlankar | | H04N 21/8455 |

FOREIGN PATENT DOCUMENTS

| | | | | |
|---|---|---|---|---|
| WO | WO-2013043472 A1 * | 3/2013 | | H04N 21/2387 |
| WO | WO-2017079033 A1 * | 5/2017 | | H04N 21/6125 |

* cited by examiner

METHOD AND APPARATUS FOR THUMBNAIL GENERATION FOR A VIDEO DEVICE

TECHNICAL FIELD

The following discussion generally relates to the recoding of video on an electronic device and streaming of the video to another electronic device. More particularly, the following discussion relates to generating a plurality of video preview thumbnails for a video program and providing a subset of the thumbnails in response to a request from a device.

BACKGROUND

Digital video recorders (DVR) are devices used to record and store broadcasted entertainment programs including video and audio. The DVR uses a tuner or network connection to receive the program and a hard drive or other storage medium to store the program. The DVR is operative to playback the program to a viewer on demand. The DVR may be further operative to alter playback locations in the program in response to a viewer requesting to rewind or fast forward the program.

Often viewers may start watching a program on a first television and wish to finish watching the program on a second device. For a program stored on a DVR, the viewer typically must record the program on each of the two devices or remain watching the program on the first device. In some systems, the DVR may be able to transmit a program to a second device. The second device may be a thin client device without significant storage capability to receive and store a program transmitted by the DVR. Thus, the thin client device must display the program as it is being received without storing much of the program in a memory. This presents a problem when a user wishes to advance or rewind a program as the thin device is unable to generate preview thumbnails to help the viewer to locate a desired location within the program. It is therefore desirable to create systems and methods to provide preview thumbnails on a thin client device to avoid these problems. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems, and system equipped with onboard control systems. By way of example, and not limitation, presented are various embodiments of thumbnail generation for video location preview in a video device.

In accordance with an aspect of the disclosure a method including receiving a video program, storing the video program on a storage medium, generating a plurality of thumbnail images in response to the video program, streaming the video program to a client device, receiving a request from the client device indicative of a search operation wherein the request includes a timestamp associated with the video program, determining a subset of the plurality of thumbnail images in response to the request, and transmitting the subset of the plurality of thumbnail images to the client device.

In accordance with another aspect of the disclosure wherein the first plurality of thumbnails are interframe images.

In accordance with another aspect of the disclosure including generating a first metafile associated with the plurality of thumbnail images wherein the first metafile includes a name and time indicator for each of the plurality of thumbnail images.

In accordance with another aspect of the disclosure wherein the request includes a search speed and wherein the subset of the plurality of thumbnail images is determined in response to the search speed.

In accordance with another aspect of the disclosure wherein the storage medium is a hard disk drive.

In accordance with another aspect of the disclosure including generating a second metafile indicative of the subset of the plurality of thumbnail images wherein the second metafile includes a name and time indicator for each of the subset of the plurality of thumbnail images.

In accordance with another aspect of the disclosure including transmitting the second metafile to the client device.

In accordance with another aspect of the disclosure wherein each of the plurality of thumbnail images is generated in response to an interframe of the video program and a time interval between interframes of the video program.

In accordance with another aspect of the disclosure, an apparatus including a video input configured to receive a video signal, a processor configured to decode the video signal to generate a video program, to generate a plurality of thumbnail images in response to the video program, to determine a subset of the plurality of thumbnail images in response to a client request and to couple the subset of the plurality of thumbnail images to a network interface, and the network interface configured to transmit and receive data on a local area network, the network interface being operative to receive the client request from a client device and to transmit the subset of the plurality of thumbnail images to the network interface for transmission to the client device.

In accordance with another aspect of the disclosure including a memory for storing the video signal and the plurality of thumbnail images.

In accordance with another aspect of the disclosure wherein the processor is further operative for including generating a first metadata file having a file name and a time for each of the plurality of thumbnail images.

In accordance with another aspect of the disclosure wherein the processor is further operative to generate a second metadata file having a file name and a time for each of the subset of the plurality of thumbnail images.

In accordance with another aspect of the disclosure including a demodulator for demodulating the video signal to generate a demodulated video signal and wherein the video program is generated in response to the demodulated video signal.

In accordance with another aspect of the disclosure wherein the processor is further operative to generate a second metadata file having a file name and a time for each of the subset of the plurality of thumbnail images and wherein the network interface is further operative to transmit the second metadata file to the client device.

In accordance with another aspect of the disclosure wherein the client request is indicative of a time location in the video program and a search speed.

In accordance with another aspect of the disclosure wherein the client request is indicative of a time location in the video program and a search speed, a time duration between each of the subset of the plurality of thumbnail images being determined in response to the search speed.

In accordance with another aspect of the disclosure wherein each of the plurality of thumbnail images is generated in response to an interframe of the video program.

In accordance with another aspect of the disclosure wherein each of the plurality of thumbnail images is generated in response to an interframe of the video program and a time interval to a previous thumbnail image.

In accordance with another aspect of the disclosure, an apparatus for generating and transmitting a thumbnail image including a tuner for receiving and demodulating a video signal to generate a video program, a memory for storing the video program, a processor for generating a first thumbnail, a second thumbnail and a third thumbnail in response to the video program, wherein each of the first thumbnail, second thumbnail and third thumbnail are separated by a duration of time within the video program and are generated in response to one of a plurality of interframes of the video program, the processor being further operative to couple the first thumbnail and the third thumbnail to a network interface in response to the request, and a network interface for receiving a request from a client device wherein the request is indicative of the video program, a progress location and a progress speed being indicative of the duration of time, the network interface being further operative to receive the first thumbnail and the third thumbnail from the processor and to transmit the first thumbnail and the third thumbnail to the client device.

In accordance with another aspect of the disclosure wherein the processor is further operative to perform an image compression technique to compress the interframe of the video program to generate the first thumbnail.

The above advantage and other advantages and features of the present disclosure will be apparent from the following detailed description of the preferred embodiments when taken in connection with the accompanying drawings.

BRIEF DESCRIPTION OF THE DRAWING FIGURES

The exemplary embodiments will hereinafter be described in conjunction with the following drawing figures, wherein like numerals denote like elements, and wherein.

The exemplifications set out herein illustrate preferred embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Furthermore, there is no intention to be bound by any theory presented in the preceding background or the following detailed description.

The general concepts described herein may be implemented in any connected device that may be used for video streaming or the like. For convenience of illustration, the following discussion often refers to a video signal processing device operative to transmit video and/or video thumbnail information to a remote device or the like. The actions taken in response to the generation of set top box video thumbnails may also be associated with the functionality of the mobile phones, portable electronic entertainment devices, and any other electronic media device capable of image or video display and/or playback. Additional details and examples are provided in the following description.

Figure 1:
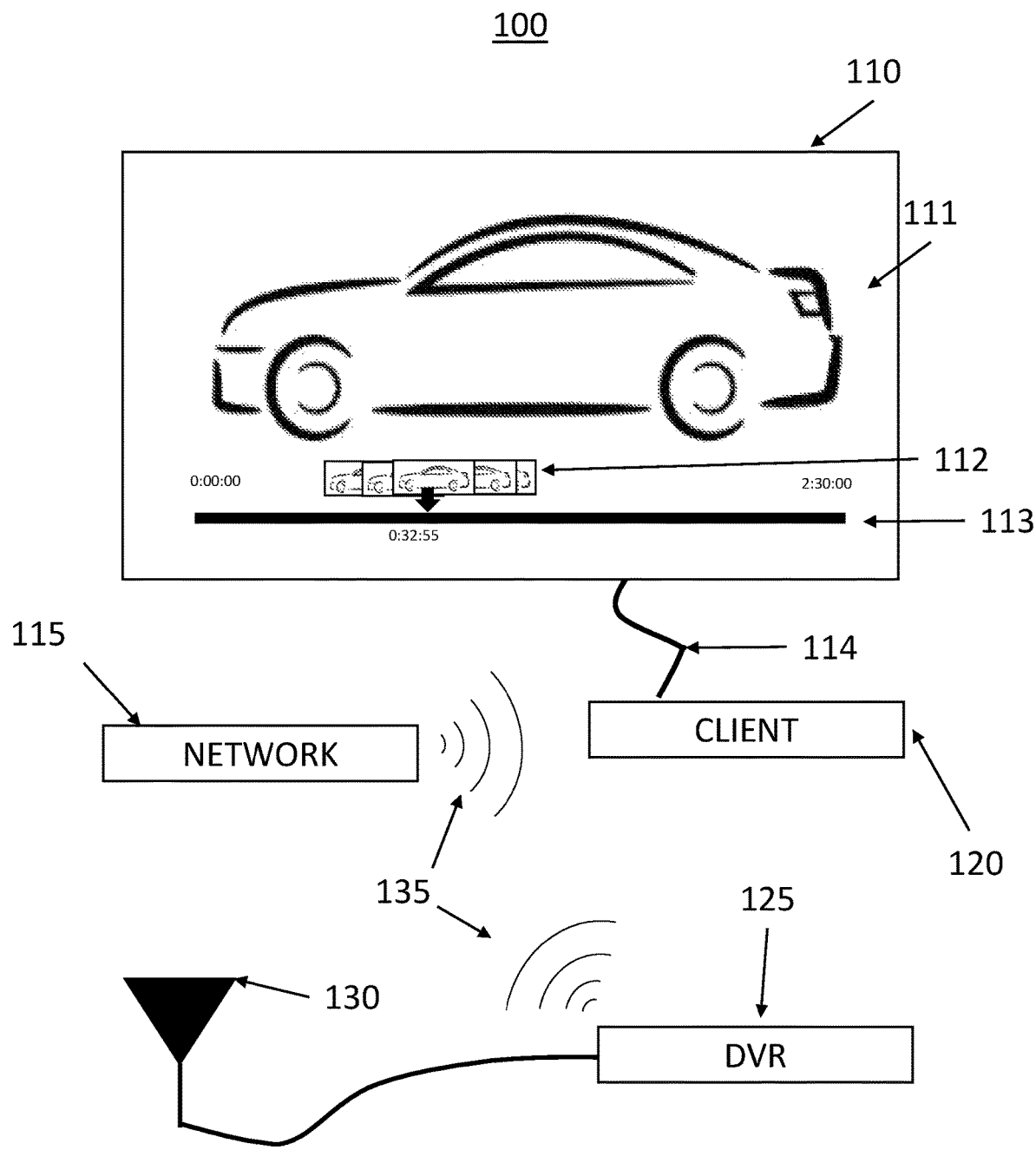
FIG. 1 shows an environment for thumbnail generation for a video device according to an exemplary embodiment of the present disclosure.

Turning now to FIG. 1, an environment for a system 100 for thumbnail generation in a video device according to an exemplary embodiment of the present disclosure is shown. The exemplary system 100 may include a display 110, a client video device 120, a network router 115, a digital video recorder (DVR) 125, and an antenna 130. According to an exemplary embodiment, the display 11o may be operative to display a video program n, a video search bar 113 and one or more thumbnail 112 images representative or images within the video program.

In this exemplary embodiment, the DVR 125 is operative to receive a video program via the antenna 130. Alternatively, the DVR 125 may receive the video program via a transmission cable, such as a coaxial cable, a fiber optic cable, a wireless network connection or the like. The DVR 125 may be operative to store the video program in an electronic format on a hard disk drive HDD or the like. The DVR 125 may be operative to convert the video program from a first format, such as Advanced Television Systems Committee (ATSC) to a second format, such as H.264 or MPEG-4 for program storage on the HDD.

The DVR 125 may be further operative to generate a thumbnail file having a plurality of periodically timed images representative of locations within the video program. For example, the DVR 125 may be operative to decode the stored video program, save a frame of the video program for every five seconds of video program run time. The frame may be stored as a JPEG image on the hard drive with a metafile storing information as to the name, location, video program indicator and time within the video program of the image. For example, for a one minute video, the DVR 125 may be operative to store 12 images representative of a frame of the video every five seconds. The DVR 125 may be operative to transmit the video program via the network router 115 using a radio frequency transmission 135 to the client 120.

The client 120 may be operative to receive the video program via a network, such as a wireless network with a wireless router 115 and a radio frequency transmission 135, from the DVR 125. The video program may be transmitted by the DVR 125 in response to a request generated by the client 120. In one exemplary embodiment, the client 120 may be operative to receive the video program from the DVR 125, to decode the video program to generate a video signal for coupling to the display 11o via a cable 114 or the like such that the display 11o presents an image 111 representative of a frame of the video program.

The client 120 may advance the video program or rewind the video program in response to a request by a user. The user may be operative to generate the request in response to a button push on a remote control, a voice command, or the like. The client 120 may then be operative to generate a user interface or an overlay over the image in to be displayed before coupling to the display 110. The user interface may include a progress bar 113 to display a current time location within the video program. When displaying the progress bar 113, the client 120 may be further operative to display a series of thumbnails 112 where the thumbnails are images representing frames in the video program situated at time locations before and after the current time location.

Figure 2:
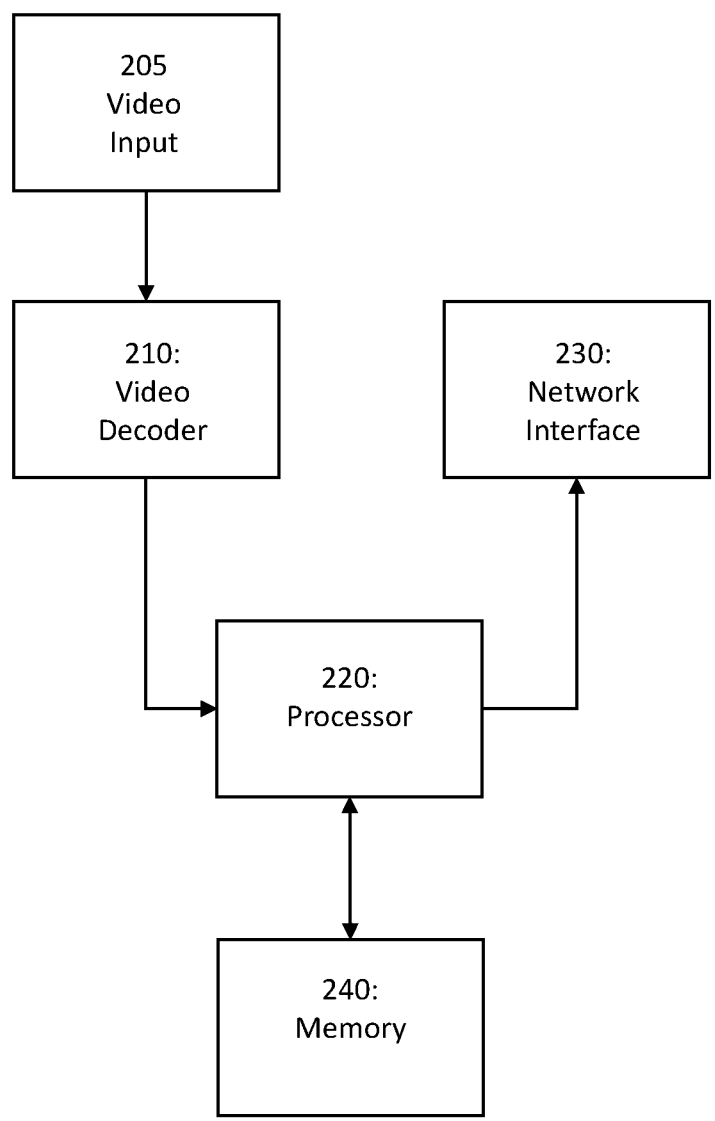
FIG. 2 shows a block diagram illustrating a system for thumbnail generation for a video device according to an exemplary embodiment of the present disclosure.

Turning now to FIG. 2, a system 200 for thumbnail generation for a video device according to an exemplary embodiment of the present disclosure is shown. The system 200 may include a video input 205, a video decoder 210, a processor 220, a network interface 230 and a memory 240. The video input 205 is operative to receive a video program and/or audio-visual program. The video input 205 may include a radio frequency or microwave tuner operative to receive a data representative of the video program modulated on a radio frequency or microwave carrier signal. Alternatively, the video input 205 may be a network interface operative to receive data formatted for network transport, such as TCP/IP and to extract the video program from the transport packets.

The video input 205 may be a cable television tuner, or the like, operative to receive an ATSC, NTSC, or quadrature amplitude modulated (QAM) signal for transporting the video program. In this exemplary embodiment, the signal may be received via a cable television network, or satellite television network, or antenna based network.

The video decoder 210 may be operative to receive the signal from the video input 205 and to decode the signal to generate a video signal in a format suitable for the processor 220. The video decoder 210 may be operative to demodulate the signal from the video input to extract the video program and to couple the video program to the processor 220. In an exemplary embodiment, the video decoder 210 may be further operative to couple the video signal to a video output for display on a video display or the like.

The processor 220 is operative to receive a video signal from the video decoder 210 and to format the video signal in a format suitable for storage in the memory 240. For example, the processor 220 may receive the video signal from the video decoder 210, encode the video signal using video compression techniques into a format such as H.264 or MPEG-4, and then store the compressed video file onto the memory 240. The processor 220 may be further operative to retrieve the compressed video file in response to a user request and to couple the video signal to a display or the like. In addition, the processor 220 may be operative to couple the video file to the network interface 230 for transmission to a client device in response to a request from the client device. In an exemplary embodiment, the processor 220 may control streaming of the video file in a video streaming format for coupling to the client device via the network interface 230.

In addition, the processor 220 is operative to generate a thumbnail file for the compressed video file and to store the thumbnail file on the memory 240. To generate the preview thumbnails of the video program, the processor 220 is operative to read the first frame of the stored video program and to determine if the frame is an I-frame, also known as an intra-frame. If the frame is an I-frame, or a complete image frame, the processor 220 then determines if the elapsed video time has exceeded a minimum duration. A thumbnail may be generated as a predetermined minimum interval in order to reduce the number of thumbnails being generated. If the frame is an I-frame and the time since generating the previous thumbnail is greater than the threshold interval, the processor 220 then decodes the frame and encodes the image as a compressed image, such as a JPEG. The processor 220 may further be operative to resize the image and/or decrease the image resolution to reduce the image size for storage and transmission. The processor 220 is then operative to store the image on the memory.

The processor 220 may further be operative to generate or append a metafile indicative of the set of thumbnail images generated for the video program. The data stored in the metafile may include frame pts, byte offset which may be the byte offset of the thumbnail in the mtn file, thumbnail file size, the frame or file offset in the file, thumbnail file name, and/or timestamp in milliseconds.

The processor 220 is further operative to receive a request from a client device via the network interface 230 requesting a subset of the thumbnails in response to a video search operation, such as rewinding or fast forwarding the video. The request may indicate the video program being viewed, the location or time progress within the video program and a direction and speed of the search operation being performed. The processor 220 is then operative to consider the speed of the search operation to determine a suitable time interval between thumbnails. For example, if the user is searching the video program at a high speed, thumbnails every one minute may be appropriate wherein a user searching at a slower speed may require thumbnails every five seconds.

The processor 220 may then couple the determined thumbnails corresponding to the video program, time progress, and speed and couple these thumbnail images to the network interface 230 for transmission to the client. The processor 220 may further generate a metafile indicative of the thumbnail images and information related to the thumbnail images and couple this metafile to the network interface 230 for transmission to the client.

The network interface 230 is operative to transmit and receive data from client devices on a network. For example, the network interface 230 may be part of a DVR and is operative to receive requests from one or more client devices on a network. The network interface 230 is then operative to transmit a list of available programs, a requested program, a thumbnail data file, or other information to a client device in response to a request from the client device. The network interface 230 may communicate directly with the client device or may communicate via a network router on a wireless local area network, such as a Wi-Fi network.

Figure 3:
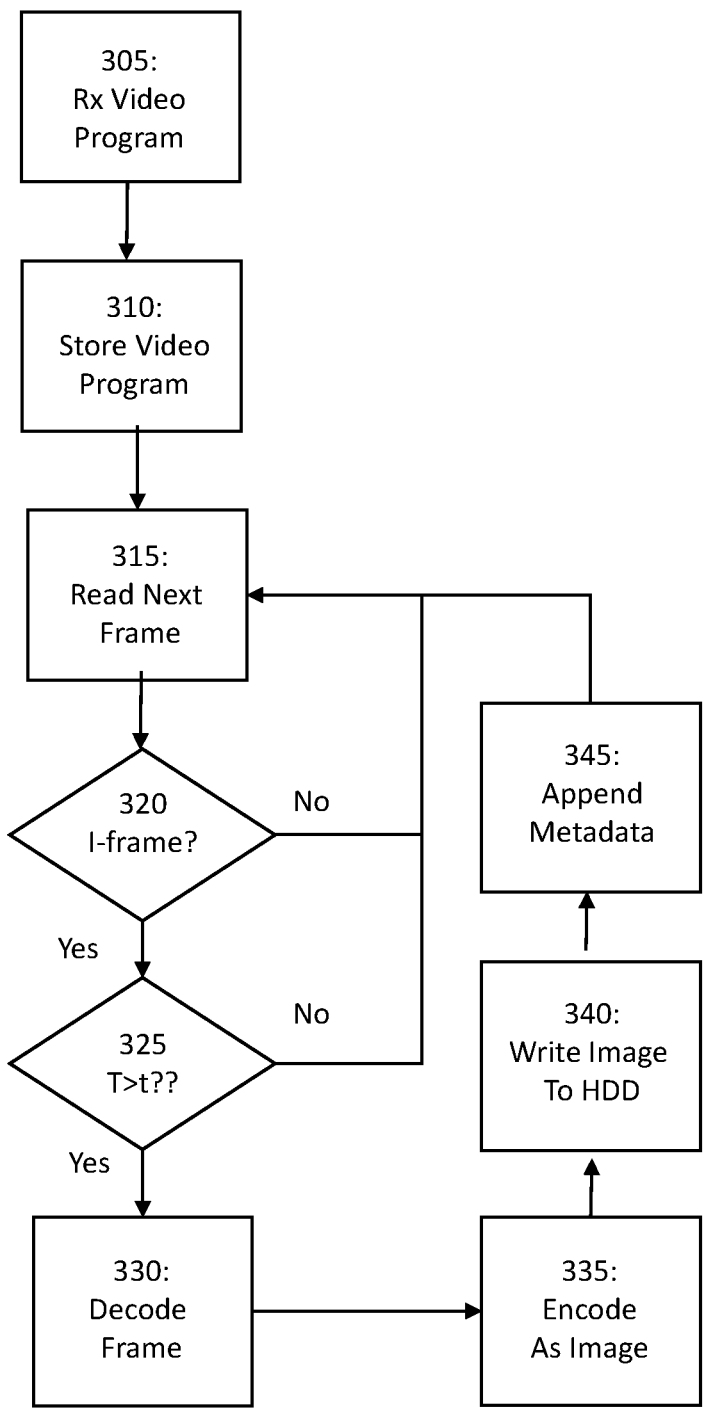
FIG. 3 shows a flowchart illustrating a method for thumbnail generation for a video device according to an exemplary embodiment of the present disclosure.

Turning now to FIG. 3, a method 300 for thumbnail generation for a video device according to an exemplary embodiment of the present disclosure is shown. The method is first operative to receive 305 a video program via a network interface, video input or the like. The video program may be transmitted via a radio frequency or microwave frequency carrier signal and transmitted via wireless or wired transmission means. In one exemplary embodiment, the video program may be received via a satellite transmission and received at a parabolic antenna equipped with a low noise block amplifier and downconverter.

The method may be next operative to store 310 the video program on a storage medium within, or accessible to, the DVR. The video program may be demodulated and/or decoded by a demodulator or video decoder, before being stored in the memory. The video program may be stored in an H.264, MPEG-2, MPEG-2, or other video file compression format.

To generate the thumbnails according to an exemplary embodiment of the present disclosure, the method is next operative to read 315 the next frame of the video program stored in the memory to establish the suitability of the frame as a source of a thumbnail. To establish the suitability, the method is first operative to determine 320 if the next frame is an I-frame. An I-frame, or intra-frame, is a complete image that does not require adjacent frames for decoding. If the frame is not an I-frame, the method is operative to return to read 315 next frame of the video program.

If the frame is determined 320 to be an I frame, the method is next operative to determine 325 if an elapsed time between frames is greater than elapsed time threshold, where the elapsed time threshold is a minimum time between thumbnails in order to limit the number of thumbnails being generated and the memory required to store the thumbnails. If the elapsed time between frames is not greater than elapsed time threshold, the method is operative return to read 315 next frame in the video program. If elapsed time between frames is greater than elapsed time, the method is next operative to decode 330 the frame and to encode 335 the frame as an image. The method may resize the image and/or decrease the image resolution to reduce the image size for storage and transmission.

Once the frame is encoded as an image in the suitable format, the method is then operative to write 340 image to a hard disk drive or other storage medium. In one exemplary embodiment, the method may be operative to generate a multi-thumbnail file (MTN) and to append the image to the MTN. As an alternative to storing the image as an individual thumbnail, the use of the concatenated MTN reduces memory requirements on the hard disk drive to block alignment and the like. The method is then operative to append 345 metadata to image file and to return to read 315 next fame of the video program.

In an exemplary embodiment, caching logic may be employed to improve the thumbnail experience by reducing the thumbnail load speed for thumbnails stored on the hard disk drive. This caching logic may be performed in the random-access memory of a device requesting the thumbnails. For longer video programs, such as three-hour movies or sporting events, it is not practical to transmit all the thumbnails in the program as the requesting device may be limited on available storage resources, such as random-access memory. To reduce the number of thumbnails transmitted and cached, the method may be operative to transmit a subset of the thumbnails based in the current program viewing time position. For example, if a user of the requesting device is watching 4-hour video program and is at 10-minute mark of the video program, the method may only transmit thumbnails from 5 to 20 minutes of the video program. Alternatively, a larger number of the thumbnails may be transmitted, and the caching logic of the requesting device may perform the selective caching. For example, the method may further employ a MTN request handling routine to handle the thumbnail requests from requesting devices. In an exemplary embodiment, the requesting device may request a number of thumbnails based on the program viewing location and the method may be then operative to transmit an MTN file with meta information on details of each thumbnail file.

Figure 4:
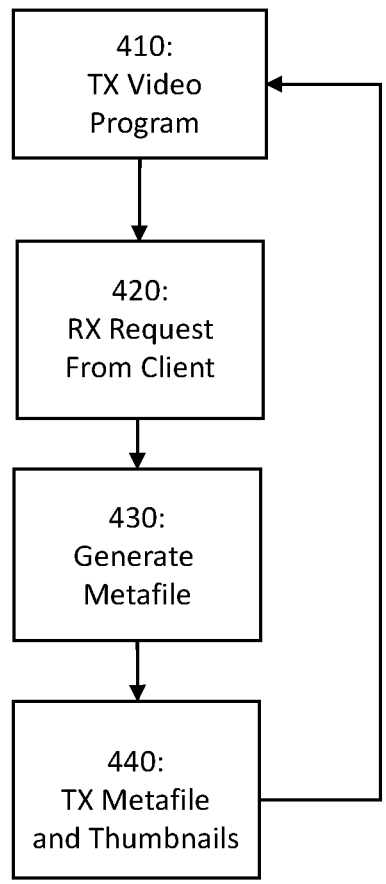
FIG. 4 shows a flowchart illustrating a method 400 for providing thumbnail images in response to a request from a client device according to another exemplary embodiment of the present disclosure.

Turning now to FIG. 4, a method 400 for providing thumbnail images in response to a request from a client device according to an exemplary embodiment of the present disclosure is shown. The method is operative to receive a request for a set of thumbnails relating a video program from a client device via a network connection or the like, and to provide a subset of the stored thumbnails related to the video program in response to the request. The method may be performed by a DVR or other network video storage device operative to stream video to a client device.

In this exemplary embodiment, the method is first operative to transmit 410 a video program to a client device. The method may stream, or continuously transmit a sequential data stream of the video program such that the receiving device does not need to download the complete video program to display the video program. The client device may be operative to receive packets of data related to the video program, to buffer and order the received packets into a correct sequence, and then sequentially display the buffered video data as more video data is being received, ordered and buffered. Buffering the video data compensates for delays in the transmission process and lost/retransmitted packets without interrupting the presentation of the video program on the display.

The method is next operative to receive 420 a request for thumbnail images from the client device. When the user performs a seek operation on a client device while watching a program being streamed from a DVR or the like, and the progress bar on the client device is activated in response to a video search request by the user. The video search request may be a fast forward or rewind operation. The request for thumbnail images from the client device may include a timestamp of the location in the video program that the progress bar was activated. The request may further include a speed of the active video search. For example, if a high-speed forward search is activated or a slow forward search is activated the speed at which the search is being performed may be indicated in the request.

The method is next operative to determine 430 a subset of thumbnails in response to the request. For example, in response to the program being streamed to the client device, the timestamp of the location in the video program, and the speed of the search, the method may be operative to determine that thumbnails spaced every 10 seconds for a one minute period before and after the timestamp for the video program should be transmitted. The method may be operative to generate a subset metafile, such as a json file, listing the subset of thumbnail names, times, file size, etc. A thumbnail offset, in bytes, may also be included in the metafile to be used for seeking by the client device in order to aid in accuracy. The method is then operative to transmit 440 the subset of thumbnails and the subset metafile to the client device and return to transmitting the video program.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

The invention claimed is:

1. A method comprising:
receiving a video program;
storing the video program on a storage medium;
generating a plurality of thumbnail images in response to the video program;

generating a first metafile associated with the plurality of thumbnail images wherein the first metafile includes a name and time indicator for each of the plurality of thumbnail images;

streaming the video program to a client device;

receiving a request from the client device indicative of a search operation wherein the request includes a timestamp associated with the video program and a search speed;

determining a subset of the plurality of thumbnail images in response to the request wherein the subset of the plurality of thumbnail images is determined in response to the timestamp associated with the video program and the search speed;

generating a second metafile indicative of the subset of the plurality of thumbnail images wherein the second metafile includes a name and time indicator for each of the subset of the plurality of thumbnail images; and transmitting the subset of the plurality of thumbnail images and the second metafile to the client device.

2. The method of claim 1 wherein the first plurality of thumbnails are interframe images.

3. The method of claim 1 wherein the storage medium is a hard disk drive.

4. The method of claim 1 wherein each of the plurality of thumbnail images is generated in response to an interframe of the video program and a time interval between interframes of the video program.

5. An apparatus comprising:

a video input configured to receive a video signal;

a processor configured to decode the video signal to generate a video program, to generate a plurality of thumbnail images in response to the video program, to generate a first metadata file having a file name and a time for each of the plurality of thumbnail images, to determine a subset of the plurality of thumbnail images in response to a client request wherein the client request includes a timestamp associated with the video program a search speed, to generate a second metadata file having a file name and a time for each of the subset of the plurality of thumbnail images in response to the timestamp associated with the video program and the search speed, and to couple the subset of the plurality of thumbnail images and the second metadata file to a network interface; and the network interface configured to transmit and receive data on a local area network, the network interface being operative to receive the client request from a client device and to transmit the subset of the plurality of thumbnail images and the second metadata file to the network interface for transmission to the client device.

6. The apparatus of claim 5 further including a memory for storing the video signal and the plurality of thumbnail images.

7. The apparatus of claim 5 further including a demodulator for demodulating the video signal to generate a demodulated video signal and wherein the video program is generated in response to the demodulated video signal.

8. The apparatus of claim 5 wherein the client request is indicative of a time location in the video program.

9. The apparatus of claim 5 wherein the client request is indicative of a time location in the video program and, a time duration between each of the subset of the plurality of thumbnail images is determined in response to the search speed.

10. The apparatus of claim 5 wherein each of the plurality of thumbnail images is generated in response to an interframe of the video program.

11. The apparatus of claim 5 wherein each of the plurality of thumbnail images is generated in response to an interframe of the video program and a time interval to a previous thumbnail image.

12. An apparatus for generating and transmitting a thumbnail image comprising:

a tuner for receiving and demodulating a video signal to generate a video program;

a memory for storing the video program;

a processor for generating a plurality of thumbnail images in response to the video program, wherein each of the plurality of thumbnail images are separated by a duration of time within the video program, for generating a first metadata file having a file name and a time for each of the plurality of thumbnail images for receiving a client request including a timestamp associated with the video program and a search speed, the processor being further operative to determine a subset of the plurality of thumbnail images in response to the timestamp associated with the video program and the search speed, to generate a second metadata file having a file name and a time for each of the subset of the plurality of thumbnail images and to couple the subset of the plurality of thumbnail images and the second metadata file to a network interface; and a network interface for receiving the request from a client device the network interface being further operative to receive the subset of the plurality of thumbnail images and the second metadata file from the processor and to transmit the subset of the plurality of thumbnail images and the second metadata file to the client device.

13. The apparatus for generating and transmitting a thumbnail image of claim 12 wherein the processor is further operative to perform an image compression technique to compress the interframe of the video program to generate the subset of the plurality of thumbnail images.

* * * * *